(12) United States Patent
Barreau et al.

(10) Patent No.: US 10,157,328 B2
(45) Date of Patent: Dec. 18, 2018

(54) METHOD AND DEVICE FOR AUTHENTIFICATION OF A USER

(71) Applicant: OBERTHUR TECHNOLOGIES, Colombes (FR)

(72) Inventors: Cedric Barreau, Colombes (FR); Bruno Javary, Colombes (FR)

(73) Assignee: IDEMIA FRANCE, Colombes (FR)

( * ) Notice: Subject to any disclaimer, the term of this patent is extended or adjusted under 35 U.S.C. 154(b) by 210 days.

(21) Appl. No.: 14/946,083

(22) Filed: Nov. 19, 2015

(65) Prior Publication Data

US 2016/0148075 A1   May 26, 2016

(30) Foreign Application Priority Data

Nov. 20, 2014   (FR) ..................... 14 02618

(51) Int. Cl.
*G06K 9/00* (2006.01)
*G06K 9/60* (2006.01)
(Continued)

(52) U.S. Cl.
CPC ............ *G06K 9/605* (2013.01); *G06F 21/32* (2013.01); *G06K 9/00087* (2013.01);
(Continued)

(58) Field of Classification Search
CPC .. H04W 88/02; H04W 12/06; H04L 63/0861; G06F 2221/2133; G06F 2221/2103;
(Continued)

(56) References Cited

U.S. PATENT DOCUMENTS 6,735,695 B1   5/2004 Gopalakrishnan et al.
7,630,524 B2 * 12/2009 Lauper ............... G06K 9/00597
382/117

(Continued)

FOREIGN PATENT DOCUMENTS

EP   1 480 105 A2   11/2004
EP   2 065 823 A1   6/2009

OTHER PUBLICATIONS

FR Search Report, dated May 29, 2015, from corresponding FR application.

*Primary Examiner* — Chan Park
*Assistant Examiner* — Mia M Thomas
(74) *Attorney, Agent, or Firm* — Young & Thompson

(57) ABSTRACT

Method of authentication of a user via a terminal including acquisition elements for performing a biometric acquisition, includes: presentation to the acquisition elements by the user of a member to be verified by biometric comparison and triggering by the user a biometric acquisition to obtain an acquisition datum; biometric comparison of the acquisition datum with a prestored reference datum, the user being authenticated if the biometric comparison is positive and not authenticated otherwise, the method further including the following steps: providing the user with elements indicative of a first angle, the user applying a corrective rotation by a second angle so as to match an acquisition datum with the second angle, and in the biometric comparison step the reference datum is matched with the first angle, the biometric comparison being positive if the second angle is substantially equal to the first angle. Device adapted to implement such a method.

18 Claims, 1 Drawing Sheet

(51) Int. Cl.
  *G06F 21/32* (2013.01)
  *G06K 9/78* (2006.01)
  *G06K 9/32* (2006.01)
  *H04W 12/06* (2009.01)
  *H04L 29/06* (2006.01)
  *H04W 88/02* (2009.01)

(52) U.S. Cl.
  CPC .......... *G06K 9/3275* (2013.01); *G06K 9/78* (2013.01); *G06F 2221/2103* (2013.01); *G06F 2221/2133* (2013.01); *H04L 63/0861* (2013.01); *H04W 12/06* (2013.01); *H04W 88/02* (2013.01)

(58) Field of Classification Search
  CPC ........ G06F 21/32; G06K 9/78; G06K 9/3275; G06K 9/00087; G06K 9/605
  See application file for complete search history.

(56) References Cited

U.S. PATENT DOCUMENTS

| | | | | |
|---|---|---|---|---|
| 7,640,135 B2 * | 12/2009 | Vock | .......... | G01C 9/00 342/104 |
| 7,916,907 B2 * | 3/2011 | Beatson | .......... | G06K 9/00154 382/115 |
| 8,531,355 B2 * | 9/2013 | Maltz | .......... | H04W 4/20 345/8 |
| 8,797,358 B1 * | 8/2014 | Tseng | .......... | G09G 5/00 345/649 |
| 8,944,590 B2 * | 2/2015 | Blum | .......... | G02C 7/101 351/113 |
| 8,965,730 B2 * | 2/2015 | Yuen | .......... | G01B 21/16 702/141 |
| 9,033,493 B2 * | 5/2015 | Howell | .......... | G02C 5/143 351/158 |
| 9,112,701 B2 * | 8/2015 | Sano | .......... | H04L 9/32 |
| 9,153,074 B2 * | 10/2015 | Zhou | .......... | G06F 1/163 |
| 9,247,212 B2 * | 1/2016 | Bose | .......... | H04N 7/18 |
| 9,256,711 B2 * | 2/2016 | Horseman | .......... | G06F 19/3418 |
| 9,275,277 B2 * | 3/2016 | Onen | .......... | G06F 3/017 |
| 9,342,610 B2 * | 5/2016 | Liu | .......... | G02B 27/017 |
| 9,342,726 B2 * | 5/2016 | Fukuda | .......... | G06K 9/00013 |
| 9,495,576 B2 * | 11/2016 | Aoki | .......... | G06K 9/00033 |
| 9,665,896 B2 * | 5/2017 | Atikoglu | .......... | G06Q 30/0609 |
| 9,726,904 B1 * | 8/2017 | Lin | .......... | G02C 5/14 |
| 9,763,592 B2 * | 9/2017 | Le | .......... | A61B 5/0482 |
| 9,866,667 B2 * | 1/2018 | Gardenfors | .......... | H04M 1/72519 |
| 2003/0187359 A1 * | 10/2003 | Njemanze | .......... | A61B 5/1176 600/454 |
| 2004/0158155 A1 * | 8/2004 | Njemanze | .......... | A61B 5/1176 600/454 |
| 2004/0201873 A1 * | 10/2004 | Erickson | .......... | G02B 5/32 359/15 |
| 2006/0157559 A1 * | 7/2006 | Levy | .......... | G06K 17/00 235/380 |
| 2007/0052672 A1 * | 3/2007 | Ritter | .......... | G02B 27/017 345/156 |
| 2007/0112287 A1 * | 5/2007 | Fancourt | .......... | A61B 5/1038 600/595 |
| 2009/0151452 A1 * | 6/2009 | Mayer-Wegelin | ... | G01C 19/567 73/504.12 |
| 2010/0142763 A1 * | 6/2010 | Beatson | .......... | G06K 9/3283 382/115 |
| 2011/0098083 A1 * | 4/2011 | Lablans | .......... | G03B 35/00 455/556.1 |
| 2011/0143811 A1 * | 6/2011 | Rodriguez | .......... | G06K 9/00986 455/556.1 |
| 2011/0221656 A1 * | 9/2011 | Haddick | .......... | G02B 27/017 345/8 |
| 2012/0166082 A1 * | 6/2012 | Fortier | .......... | G01C 21/16 701/504 |
| 2012/0190404 A1 * | 7/2012 | Rhoads | .......... | G06F 17/30265 455/556.1 |
| 2012/0231839 A1 * | 9/2012 | Seo | .......... | G06F 3/017 455/556.1 |
| 2013/0223673 A1 * | 8/2013 | Davis | .......... | G06K 9/78 382/100 |
| 2015/0242613 A1 * | 8/2015 | Kuscher | .......... | G06F 3/16 726/19 |
| 2015/0347733 A1 * | 12/2015 | Tsou | .......... | G06F 3/013 726/18 |
| 2016/0012217 A1 * | 1/2016 | Wolf | .......... | G06F 21/83 726/18 |
| 2016/0012465 A1 * | 1/2016 | Sharp | .......... | G06Q 20/18 705/14.17 |
| 2017/0149774 A1 * | 5/2017 | Blinn | .......... | H04L 63/0861 |
| 2017/0245757 A1 * | 8/2017 | Sales | .......... | A61B 5/1114 |

* cited by examiner

METHOD AND DEVICE FOR AUTHENTIFICATION OF A USER

FIELD OF THE INVENTION

The present invention concerns a device for authentication of a user.

BACKGROUND OF THE INVENTION

In the technical field of the authentication of persons, it is known to use a biometric authentication method. By analyzing a representation of a member, such a method verifies that a user is indeed an authorized person. Numerous members are candidates in that they are specific to a person. Thus such a member may be the finger, the eye, the palm, the face, etc.

During a preliminary and preparatory first phase, typically effected only once, a known biometric authentication method performs a first acquisition of the member, from a person, whose identity is certain, and extracts therefrom a representation that is referred to as a reference datum. This reference datum is stored, advantageously in a secure manner, on a memory medium, advantageously a secure element, associated with said person. In a second operational phase, repeated as many times as necessary, a user claiming to be said person attempts to authenticate himself or herself. The biometric authentication method performs a second acquisition of the member from the user and extracts therefrom a representation that is referred to as an acquisition datum. The biometric authentication method then performs a biometric comparison in order to determine if the acquisition datum and the reference datum are indeed two representations of the same member. If this comparison is positive, the user is authenticated and is considered to be the person.

The problem that can arise, and that the invention proposes to solve, is that an "intermediary" or "man in the middle" intercepts and copies an acquisition datum or one of its representations during an operational phase, typically by intercepting a communication between the acquisition means performing the biometric acquisition and a comparator performing the biometric comparison, and then submits this acquisition datum, short-circuiting the step of acquisition from the member, to attempt to obtain a positive authentication illegitimately.

It is desirable to modify the biometric authentication method in order to foil such a scenario.

SUMMARY OF THE INVENTION

To this end, the basic principle of the invention is to introduce at least one diversity, in order to create at least one variation from one authentication to another and thereby to prevent simple playback by submitting information previously stolen, and therefore identical, leading illegitimately to a positive authentication.

The basis of this diversity consists in introducing a rotation by an angle varying at random from one authentication to another. This angle is indicated to the user, who takes account of it and enters it when performing the biometric acquisition and obtaining the acquisition datum. The biometric comparator knows this angle and can eliminate its influence at the time of the biometric comparison.

It is therefore possible to perform a biometric authentication method with at least the same level of security, for which the acquisition datum varies, as a function of said angle, from one authentication to another.

The invention consists in a method of authentication of a user by means of a terminal including acquisition means adapted to perform a biometric acquisition, including the following steps: presentation to the acquisition means by the user of a member to be verified by biometric comparison and triggering by the user of a biometric acquisition in order to obtain an acquisition datum, biometric comparison of the acquisition datum with a prestored reference datum, the user being authenticated if the biometric comparison is positive and not authenticated otherwise, the method further including the following steps: providing the user with means indicative of a first angle, the user applying a corrective rotation by a second angle in such a manner as to match an acquisition datum with said second angle, and in that in the biometric comparison step the reference datum is matched with the first angle, the biometric comparison being positive if the second angle is substantially equal to the first angle.

In accordance with another feature, the first angle is non-zero.

In accordance with another feature, the first angle is substantially equal to the second angle according to an angular tolerance at least equal to the tolerance of the biometric comparison and at most equal to a tolerance equal to 90°, preferably equal to 15°, and more preferably equal to the tolerance of the biometric comparison.

In accordance with another feature, an acquisition datum, respectively a reference datum, is matched with an angle in that it is accompanied by said angle or in that it is obtained after application of a rotation by an angle.

In accordance with another feature, the indicative means are visual and are turned by the first angle.

In accordance with another feature, the visual indicative means are scrambled in such a manner as to oppose interpretation by an automaton by "captcha" type processing.

In accordance with another feature, the corrective rotation is applied to the member.

In accordance with another feature, the corrective rotation is applied to the acquisition means.

In accordance with another feature, the corrective rotation is applied to the terminal.

In accordance with another feature, the acquisition means rotate relative to the terminal.

In accordance with another feature, the method further includes communicating beforehand to the user a secret necessary for determining the second angle.

In accordance with another feature, the secret is a function and in the biometric comparison step the reference datum is matched with the image of the first angle by said function.

In accordance with another feature, the function adds a third angle, preferably a multiple of 45°.

In accordance with another feature, the indicative means include a plurality of visual indicative means, each of the visual indicative means being indicative of a different first angle and each of the visual indicative means being associated with a different frame of reference, the secret is information, such as a frame of reference category, enabling the user to determine a particular frame of reference and in the biometric comparison step the reference datum is matched with the first angle associated with said particular frame of reference.

In accordance with another feature, the first angle is produced by a random generator, preferably supplied by a secure element The invention further concerns an authentication device including means for implementing such a method.

In accordance with another feature, the acquisition means rotate relative to the terminal and are adapted to measure the angle of said rotation.

BRIEF DESCRIPTION OF THE DRAWINGS

Other features, details and advantages of the invention will emerge more clearly from the detailed description given hereinafter by way of illustration and with reference to the drawings, in which.

DETAILED DESCRIPTION OF THE INVENTION

Figure 1:
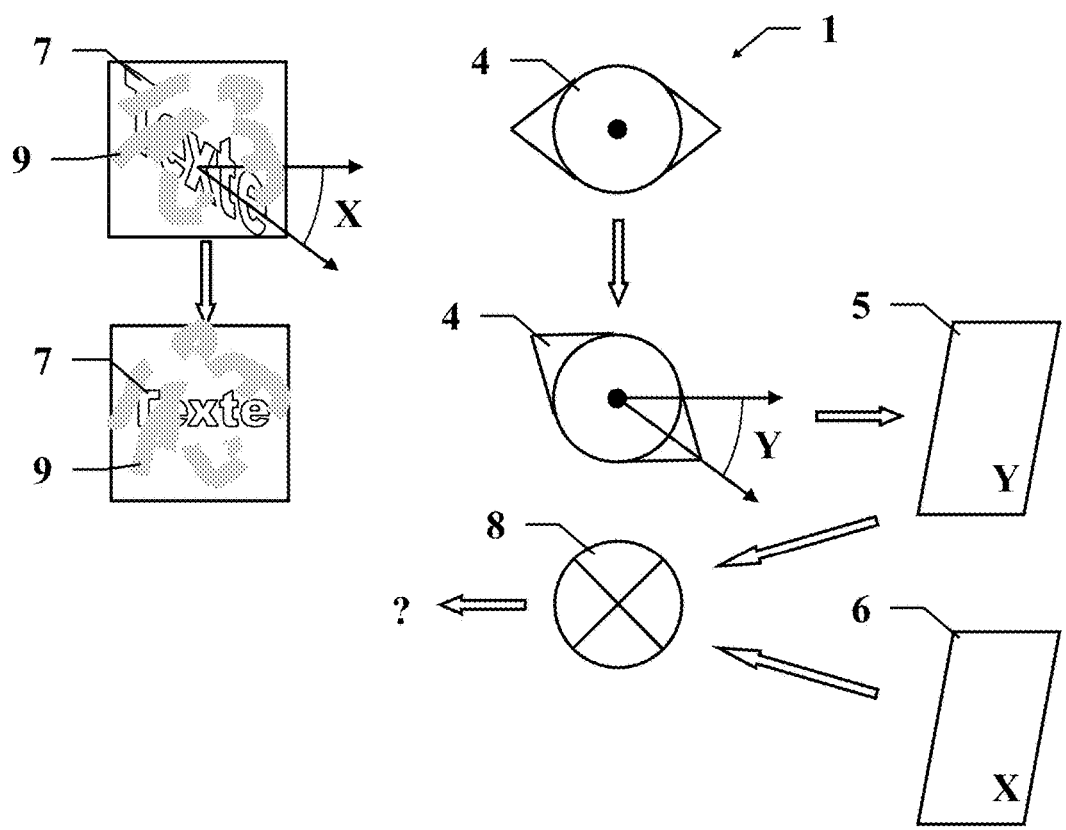
FIG. 1 is a block diagram of the basic principle of the invention.

A method of authentication of a user 1 utilizes in known manner a terminal 2. This terminal 2 may be a ticket dispenser, a public computer terminal, a personal computer or and advantageously a mobile device such as a smartphone or the like. Said terminal 2 includes acquisition means 3 adapted to perform a biometric acquisition 5. Said acquisition means 3 therefore consist of a dedicated sensor adapted to perform a biometric acquisition, such as a press-on or slide fingerprint sensor, or a dedicated iris or retina print sensor, or a generic sensor such as a video camera, a still camera or a microphone for acquiring a voice sample. A generic sensor for a visual representation of a member may advantageously re-use an existing sensor on the terminal 2: the webcam of a personal computer or the still camera included in a smartphone.

Using this terminal 2, it is possible to perform an authentication method including the following successive steps. In accordance with a first step, often initiating the method, the user 1 presents to the acquisition means 3 a member 4 that is the subject of the biometric verification. As a function of the type of verification, assumed to be known to the user 1, the user 1 presents their finger, their eye, etc. The user 1 triggers the performance by the terminal 2 of a biometric acquisition, performing acquisition and processing of said member 4 presented. Said triggering may advantageously be automatic and initiated merely by the detection of the presence of the member 4 in the field of perception of the acquisition means 3. The result of the acquisition by the acquisition means 3 of a representation of the member 4 and where applicable its processing by the terminal 2 produce a representation of the member 4 that is referred to as an acquisition datum 5.

Thus in the illustrative case of a fingerprint, retina or iris print there is performed an acquisition of an image of the finger or of the eye, or to be more precise of the retina or of the iris. Conventional processing consists in extracting from this image characteristic elements each matched with their position and also referred to as minutiae, sufficient for performing a biometric comparison 8. These minutiae are much less heavy in terms of quantity of information and advantageously require less memory for storing them.

During a second step, a biometric comparison 8 is performed between the acquisition datum 5 that has just been obtained from a user 1 and a previously stored reference datum 6 obtained from a person. The reference datum 6 has been obtained previously, advantageously in a context in which the identity of the person is certain. The reference datum 6 is obtained, for example, in accordance with a method of acquisition and of processing similar to that used and described above for the acquisition datum 5.

In the known manner, a biometric comparison 8 is able to determine with good certainty if the member 4 represented by the acquisition datum 5 is indeed the same member as represented by the reference datum 6 and therefore to determine if the user 1 is indeed the person that they claim to be. The biometric comparison 8 therefore renders a binary result: YES the acquisition datum 5 matches the reference datum 6 and the user 1 may be considered to be that person and be authenticated, or NO the acquisition datum 5 does not match the reference datum 6 and the user 1 cannot be authenticated as being that person.

As shown in FIG. 1, the invention completes this process by adding the following steps. In accordance with a first additional, and necessarily preliminary, step, the method supplies to the user 1 means 7 indicative of a first angle X. In accordance with a second step, during the obtaining of the acquisition datum 5, the user 1 applies a corrective rotation by a second angle Y so as to match the acquisition datum 5 with said second angle Y. Moreover, the method modifies the biometric comparison step 8 so that the reference datum 6 is matched with the first angle X, the very one that has just been supplied to the user 1 via the indicative means 7 and so that the biometric comparison 8 is positive if the second angle Y is substantially equal to the first angle X.

Accordingly, if the user 1 is indeed the person and applies a corrective rotation by a second angle Y substantially equal to the first angle X, known to the user via the indicative means 7, a biometric comparison 8 will render a positive result.

If for any reason, for example in connection with an attempted fraud, the user 1 is not able to obtain the first angle X and/or to apply a corrective rotation by an angle substantially to the first angle X, a negative comparison will be obtained.

In order not to render trivial the benefit of the authentication method, the first angle X is advantageously non-zero.

It is necessary to define what is meant by the first angle X and the second angle Y being substantially equal. Some tolerance is advantageous in that it makes it possible to accommodate inevitable manipulation errors. Thus when the second angle Y is entered by the user 1, appreciation errors on the part of the user 1 are possible.

Moreover, a biometric comparator 8, by virtue of its mode of operation, incorporates a certain tolerance. The method in accordance with the invention, re-using such a biometric comparator 8, cannot lay claim to a lower tolerance. Also the tolerance of the biometric comparison 8 is a lower limit of the tolerance of the authentication method. An algorithm conventionally used to compare minutiae extracted from a fingerprint, retina or iris print typically has a tolerance equal to 15°. Such a tolerance is largely sufficient to mask the manipulation and/or appreciation errors previously referred to.

As for the upper limit of the tolerance, it is necessary to avoid making it too high, at risk of losing all the discriminatory value of the method. Also, the maximum tolerance is advantageously reduced to less than 90°. The smaller this tolerance, the more selective the authentication method. Also, the maximum tolerance is preferably equal to 15° and more preferably equal to the minimum tolerance, i.e. the tolerance of the biometric comparison 8.

Although in accordance with the prior art the biometric comparison 8 is effected between an acquisition datum 5 and a reference datum 6 both obtained at the same angle, the biometric comparison 8 in accordance with the invention is to the contrary effected between an acquisition datum 5 matched with a second angle Y and a reference datum 6 matched with a first angle X. During the biometric comparison it is verified that the first angle X and the second angle Y match and that the biometric acquisition datum 5 and the reference datum 6 match. The entry of at least one first angle X that has been supplied and that the user 1 must reproduce in the form of a corrective rotation by a second angle Y has the objective of making the task of a fraudster more complicated. In accordance with the embodiments, it is apparent that the task of an authorized user 1 is advantageously not made more complicated by the method, or not much more complicated.

It has been seen that the reference datum 6 is matched with an angle X and that the object of the corrective rotation is to match the acquisition datum 5 with an angle Y. This matching may take a number of forms.

In accordance with a first embodiment, an acquisition datum 5, respectively a reference biometric datum 6, is matched with an angle X,Y in that it is accompanied by said angle X,Y. In this case the biometric comparator 8 receives as input an acquisition datum 5 produced in the conventional manner, as in the prior art, a second angle Y, indicated by the user 1, a first angle X communicated by the method and a reference datum 6, produced in the conventional manner, as in the prior art. The biometric comparison 8 independently compares on the one hand the acquisition datum 5 with the reference datum 6 as in the prior art and on the other hand the first angle X and the second angle Y. The result of the biometric comparison 8 is a logic AND between the foregoing two independent comparisons.

In accordance with another embodiment, producing a more intimate marriage with the angle, an acquisition datum 5, respectively a reference datum 6, is matched with an angle X, Y in that it is obtained after application of a rotation by an angle X, Y to the member to be verified by biometric comparison or to its representation. In accordance with this embodiment, where the angle X,Y is embedded in the acquisition datum 5, respectively the reference datum 6, the biometric comparison 8 receives an acquisition datum 5 "turned" by a second angle Y and compares it with a reference datum 6 "turned" by a first angle X.

In accordance with another, composite embodiment the biometric comparison 8 receives one of the following: the acquisition datum 5 or the reference datum 6, "turned" by an angle, and the other datum matched with a non-embedded angle.

In accordance with the embodiment, the rotation by an angle X,Y may be applied at different stages. In accordance with a first embodiment, the rotation may be applied during the acquisition of the member 4 by a rotation of the member 4 relative to the sensor 3, the acquisition being performed with a turned member 4. In accordance with another embodiment, the rotation may be applied once the acquisition has been performed, by applying by calculation a rotation to the representation of the member 4. Thus in the case of an image sensor, the image of the member may be turned by application of a rotation algorithm. In accordance with a further embodiment, the rotation may be applied once the processing of this representation has been performed. Thus in the illustrative case of processing by extraction of minutiae with their positions, the positions of the minutiae of a turned representation may be obtained by applying a rotation to the minutiae extracted from a straight representation.

These various embodiments may be combined. Thus the acquisition datum 5 may be turned in accordance with one embodiment and the reference datum 6 may be turned in accordance with another, different or identical embodiment.

The first angle X must be supplied to the user 1 for the latter to determine the second angle Y. It may be supplied by any means. Also, the means 7 indicative of the first angle X may be very varied.

Such indicative means 7 are advantageously supplied via reproduction means of the terminal 2: loudspeaker, screen or the like.

In accordance with one embodiment, the indicative means 7 may therefore include a sound message, for example produced by a voice synthesizer, indicating a value of the first angle X.

In accordance with another embodiment, the indicative means 7 may be visual and may include a numerical display of a value of the first angle X.

The visual and sound modes may further be combined: a part of the information being supplied by sound, with another part of the information supplied visually. Thus the value of the angle X may be indicated by a sound message, for example, while the unit (degree, turn, etc.) is displayed visually.

In accordance with another embodiment, the indicative means 7 may be visual and show in analog form the first angle X, for example by means of a sector indicated by two segments.

In accordance with another embodiment, the indicative means 7 consist of visual indicative means turned by the first angle X. Such visual indicative means may be a photo, a drawing or a text.

In order that the rotation can be seen by a user 1, the visual indicative means advantageously have a reference orientation relative to which the angle X may be shown. Thus a drawing of a car, for example, seen from the side, the line passing through the two wheels of which indicates a horizontal reference. Similarly, a photo of a streetlamp the axis of which is expected to be vertical. Such a symbol may be or include a word or a line of text, as shown in FIG. 1, the base line of which, usually horizontal, provides a reference.

In accordance with one embodiment, the visual indicative means are scrambled by "captcha" type processing 9. This is particularly useful with regard to the problem that it is required to solve, namely preventing partially or fully automatic playback. The "captcha" type processing includes additional superimposed elements 9 intended to scramble visual indicative means of the indicative means 7. These additional elements 9 are designed to oppose interpretation by an automaton, by tricking a recognition algorithm, whilst being easy for a human being to sort. Access to the first angle X is therefore made more complicated or even rendered impossible for a fraudster using recognition software while the nuisance remains minimal for a human user 1 viewing said graphic visual indicative means.

It has already been seen that the user 1 matches the acquisition datum 5 with a second angle Y by means of a corrective rotation. This corrective rotation, intended to indicate to the terminal 2 a second angle Y, may take different forms.

In accordance with a first embodiment, the second angle Y is indicated to the terminal 2 and to the method by any capture means. The user 1 can therefore use a keypad to type in a value of the angle Y or use "+" and "−" keys to enter information into a graph or sector indicative of the value of the angle Y. The user 1 may further use a pointing device such as a mouse or a touchpad to select a value of the angle Y. The user 1 can also be provided with a real or virtual potentiometer for supplying a value of the angle Y.

One way for the user 1 to match an acquisition datum 5 with a second angle Y is to perform a corrective relative rotation applied to said acquisition datum by an angle equal to the second angle Y. There are several possibilities for this.

In accordance with a first embodiment, the corrective rotation is applied to the member 4. In this embodiment, the user 1 turns the member 4 when it is presented to the acquisition means 3 during the biometric acquisition to produce the acquisition datum 5. Thus the acquisition means 3 remain immobile and the user 1 turns, about a rotation axis substantially perpendicular to the plane of the acquisition means 3, their finger in the case of a fingerprint or their head in the case of a retina, iris or face print, to present the finger, the eye or the face to the sensor 3 turned through an angle Y.

In accordance with another embodiment, as an alternative to or complementary with the preceding one, the corrective rotation is applied to the acquisition means 3. In this embodiment, the user 1 turns the acquisition means 3 before presenting the member 4 in the usual manner, i.e. not turned, to the acquisition means 3 to produce the acquisition datum 5. Thus the member 4 remains immobile and the user 1 turns the acquisition means by an angle Y about a rotation axis substantially perpendicular to the plane of the acquisition means 3.

In accordance with a further embodiment, the corrective rotation is applied to the terminal 2 as a whole. This embodiment can be envisaged in all cases and more particularly when the terminal 2 is a mobile terminal, for example a smartphone. It should be noted that according to the configuration of the terminal 2 the acquisition means 3 may be rigidly connected to the terminal 2 and applying a rotation to the terminal 2 is a way to apply the same rotation to the acquisition means 3 and therefore to correspond to some of the foregoing embodiments (rotation of the acquisition means 3).

The corrective rotation, whether applied to the member 4, to the acquisition means 3 or to the terminal 2, enables the user 1, the proprietor of said member 4, to enter a second angle Y. It is to be noted that the angle of the corrective rotation may be equal to a second angle Y or, in accordance with an agreement to the contrary between the user 1 and the method, equal to the opposite of the second angle Y, or again and at will equal to the angle Y or to its opposite.

Some ways of applying the corrective rotation have the effect of simultaneously applying a rotation to the indicative means 7. This is the case for a rotation of the terminal 2 when the indicative means 7 are visual and displayed on display means rigidly connected to the terminal 2. This is also the case for a rotation of the member 4 when the latter is the eye/iris/retina or the face and a rotation of the member 4 leads to a rotation of the eye of the user who is looking at the indicative means 7.

In accordance with a particularly advantageous embodiment, one of the embodiments that also turn the indicative means 7, the second angle Y of the corrective rotation is advantageously such that it "straightens" the indicative means 7 into a reference orientation. The task of the user 1 is therefore considerably simplified, in that they apply a corrective rotation by turning their eye 4 or the terminal 2, and in doing so turn the indicative means 7, until the latter is placed in a reference orientation that cancels out the first angle X. In this embodiment, the user 1 does not need to measure or to know a value of the first angle X but, in a similar manner, applies a corrective rotation to the member 4 or to the terminal 2 until the indicative means 7 are seen in their reference orientation, corresponding to a zero first angle X. In doing so, the user 1 "copies" the first angle X in an analogous manner into the second angle Y of the corrective rotation.

As seen above, the acquisition means 3 may be constrained to rotate with the terminal 2.

In accordance with an alternative embodiment, the acquisition means 3 rotate relative to the terminal 2. Such an embodiment may be used in the following manner, for example: the user 1 turns the terminal 2 through a second angle Y, as before, to straighten the indicative means 7. The acquisition means 3 are then turned, manually or automatically, through an angle opposite the second angle Y, so that the acquisition means 3 resume their initial orientation, corresponding to the initial or reference orientation of the terminal 2.

Such a mode of operation is advantageous for some biometric sensors that function better in a single reference orientation. This is the case, for example, of a sliding fingerprint sensor. Such a sensor, known in itself, includes a line image sensor over which a finger must slide, substantially perpendicularly to said line. The operation of such a sensor and the training of a user 1 in its use are significantly improved if the line is in a constant, typically horizontal, orientation.

In such an embodiment, the terminal 2 or the acquisition means 3 advantageously include(s) an angular sensor adapted to measure the angle by which the acquisition means 3 are turned relative to the terminal 2. This angular sensor, which here measures an angle equal to the opposite of the second angle Y, enables the method to determine this second angle Y and therefore to match the acquisition datum 5 with this second angle Y. In this case the acquisition is done "straight" and the angle Y is supplied with the acquisition datum 5, with no embedding.

It has been seen how an additional angle may be used to strengthen the security of an authentication method.

The security of such a method may be further strengthened by the use of a secret shared beforehand between the method and the user 1. The secret is communicated to the user 1 beforehand and is needed to determine the second angle Y. This communication is advantageously secure, as with a PIN code, in order to be sure that it goes to the correct person. A fraudster has no means or limited means for finding out this secret and therefore the determination of the second angle Y is made even more complicated for a fraudster.

The object of the secret is to enable the user 1 to modify the second angle Y in a manner that can be predicted and therefore verified by the method. Examples of such secret are described next.

In accordance with the first example the secret consists in a function F. This function F is known to the method and has been communicated beforehand to the user 1. In the biometric comparison step 8, the reference datum 6 is matched with a first angle $F(X)$ that is an image of the first angle X by said function F. For their part, the user 1 determines said first angle X via the indicative means 7 and determines a second angle Y by applying the same function F to the first angle X and uses this second angle $Y=F(X)$ when obtaining the acquisition datum. The biometric comparison 8 therefore compares an acquisition datum 5 matched with a second angle $Y=F(X)$ and a reference datum 6 matched with an angle $F(X)$. If the same function F is used on both sides, the angles compared are identical and the comparison is positive.

In accordance with one embodiment, the function F adds a third angle Z, according to the formula $F(x)=x+Z$. In this case the shared secret is the value of the third angle Z. When they apply the corrective rotation, the user 1 performs a corrective rotation by a second angle Y equal to the angle X+Z.

For this practice to remain simple for the user 1, the third angle Z is advantageously an angle that is easy to imagine and to use, such as an angle that is a multiple of 45°. For a third angle Z equal to 180°, for example, the user 1 therefore applies a rotation by the angle X and then a half-turn. When the indicative means 7 turn with the corrective rotation, the corrective rotation is advantageously such that it "straightens" the indicative means 7 so that they end up aligned with their reference orientation, but reversed, with the top at the bottom.

Figure 2:
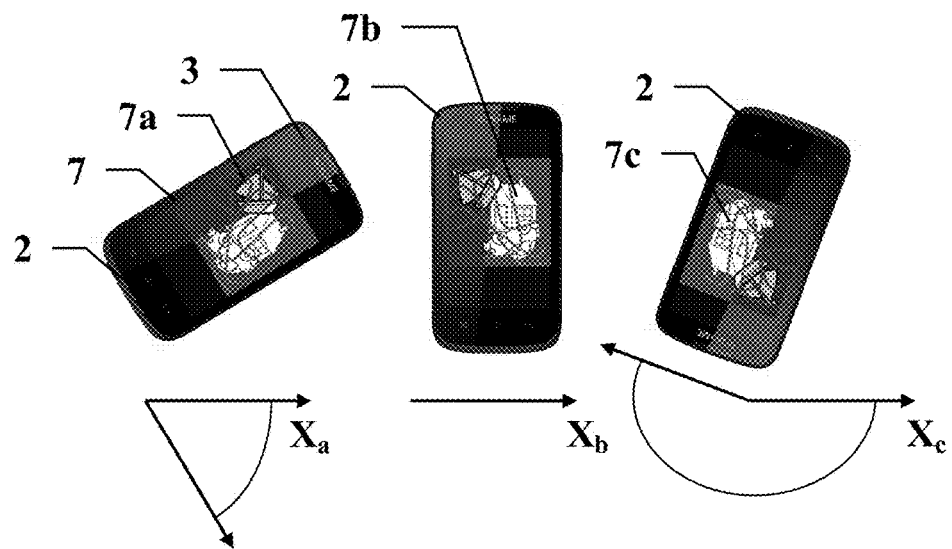
FIG. 2 shows the basic principle of indicative means including a plurality of first angles.

In accordance with another embodiment, more particularly shown in FIG. 2, the indicative means 7 include a plurality of visual indicative means 7a-c, each visual indicative means 7a-c indicating a different first angle X,Xa-c and each visual indicative means 7a-c being associated with a different frame of reference. In this case the secret consists of information such as a frame of reference category enabling the user 1 to determine a particular frame of reference corresponding to the "right" visual indicative means 7a-c.

A fraudster is therefore faced with a diversity of visual indicative means 7a-c and therefore of possible first angles Xa-c. On the other hand, the knowledge of the secret enables the user 1 to determine immediately the "right" visual indicative means and therefore the "right" first angle Xa-c.

On the method side, the "right" first angle Xa-c, i.e. the first angle X associated with the particular frame of reference that the user 1 is able to discriminate with the aid of the secret, is known and is matched with the reference datum 6 during the biometric comparison step 8.

Thus in accordance with the illustrative example from FIG. 2, the indicative means 7, here displayed on the screen of a terminal 2 shown with three orientations Xa, Xb, Xc, include three different visual indicative means 7a, 7b, 7c. Here a boat 7a is turned a first angle −Xa and appears straightened horizontally after rotation of the terminal 2 by an angle Xa, a house 7b is turned by a first angle −Xb (here substantially zero) and a car 7c is turned by a first angle −Xc. Thus the indicative means 7 define three first angles Xa,Xb, Xc and a fraudster has difficulty determining the "right" one. Here the visual indicative means serve as frames of reference and each angle Xa,Xb,Xc is therefore associated with a different frame of reference 7a,7b,7c. The color or any other visual indication could also serve as a frame of reference. The user 1 holds additional information contained in the secret enabling them to determine the "right" frame of reference 7a,7b,7c and therefore the right first angle Xa,Xb, Xc. Thus here the secret consists, for example, of the car frame of reference 7c. The user 1 then determines the right first angle Xc associated with the car frame of reference 7c. The secret advantageously more generally includes a frame of reference category such as: rolling means. It is therefore possible to vary the frame of reference object from one authentication to another.

In order to make the method secure, the first angle X that is an important component of the security of the method is advantageously random. To this end the first angle X may advantageously be produced by a random generator.

Such random production ensures that the first angle X is not known until the time at which the indicative means 7 are supplied to the user 1, i.e. at the time of the acquisition. The advantageous consequence of this is that said first angle X cannot be known in advance and therefore cannot be anticipated by a fraudster.

A secure element, of the microcircuit type, for example on a smartphone SIM card, on a USB key or a memory card, may advantageously include such a random generator. Here the expression secure element refers to such a secure microcircuit, known to the person skilled in the art as a secure element (SE) or embedded secure element (ESE).

Such a secure element, advantageously the same as that including a random generator, advantageously stores the reference datum 6 and performs the biometric comparison 8. Such a function is known in the field of secure elements and advantageously enables use of a reference datum 6 to perform a biometric comparison 8 without the reference datum 6 leaving the secure element, thus advantageously limiting the risk of disclosure or dissemination of said reference datum 6.

The invention further concerns a device, such as a terminal 2, adapted to implement such an authentication method.

The invention claimed is:

1. A method of authentication of a user by means of a terminal including a biometric acquisition device, including the following steps:
   presentation to the biometric acquisition device by the user of a member to be verified by biometric comparison and triggering by the user of a biometric acquisition in order to obtain an acquisition datum;
   biometric comparison of the acquisition datum with a prestored reference datum, the user being authenticated if the biometric comparison is positive and not authenticated otherwise;
   providing the user with indicia of a first angle (X);
   the user applying a corrective rotation by a second angle (Y) in such a manner as to match an acquisition datum with said second angle (Y);
   and in the biometric comparison step the reference datum is matched with the first angle (X), the biometric comparison being positive if the second angle (Y) is substantially equal to the first angle (X).

2. The method according to claim 1, wherein the first angle (X) is non-zero.

3. The method according to claim 1, wherein the first angle (X) is substantially equal to the second angle (Y) according to an angular tolerance at least equal to the tolerance of the biometric comparison and at most equal to a tolerance equal to 90°.

4. The method according to claim 1, wherein the indicia are visually displayed on a screen at the first angle (X) with respect to a reference axis.

5. The method according to claim 4, further comprising scrambling the indicia by "captcha" processing.

6. The method according to claim 1, wherein the corrective rotation is applied to at least one of the member, the biometric acquisition device or to the terminal.

7. The method according to claim 6, wherein the biometric acquisition device rotates relative to the terminal.

8. The method according to claim 1, wherein the biometric comparison comprises matching the reference datum with the first angle (x) modified by a mathematical function.

9. The method according to claim 8, wherein the mathematical function comprises a third angle (Z) added to the first angle (X).

10. The method according to claim 9, wherein the third angle (Z) is a multiple of 45°.

11. The method according to claim 1, wherein the indicia include a plurality of visual indicative indicia (7a-c), each of the visual indicative indicia (7a-c) being indicative of a different first angle (X,Xa-c) and each of the visual indicative indicia (7a-c) being associated with a different frame of reference, and where additional information enables the user to determine a particular frame of reference and in that in the biometric comparison the reference datum is matched with the first angle (X,Xa-c) associated with said particular frame of reference.

12. The method according to claim 1, further comprising randomizing by means of a random generator.

13. An authentication device implementing the method according to claim 1.

14. The authentication device according to claim 13, wherein the biometric acquisition device rotates relative to the terminal and is adapted to measure the angle of said rotation.

15. The method according to claim 1, wherein the first angle (X) is substantially equal to the second angle (Y) according to an angular tolerance at least equal to the tolerance of the biometric comparison and at most equal to a tolerance equal to 15°.

16. The method according to claim 1, wherein the first angle (X) is substantially equal to the second angle (Y) according to an angular tolerance at least equal to the tolerance of the biometric comparison and at most equal to a tolerance equal to the tolerance of the biometric comparison.

17. The method according to claim 1, comprising the steps of:
    receiving the acquisition datum associated with the second angle (Y), and the reference datum associated with the first angle (X);
    comparing the acquisition datum and the reference datum; and
    comparing the first angle (X) and the second angle (Y).

18. The method according to claim 1, comprising the step of comparing the acquisition datum turned by the second angle (Y) and the reference datum turned by the first angle (X).

* * * * *